United States Patent
Batten et al.

(10) Patent No.: US 11,708,691 B2
(45) Date of Patent: Jul. 25, 2023

(54) NON-CONTACT SENSOR FOR DETERMINING A F.O.G. LEVEL IN A SEPARATOR, INCLUDING ULTRASONICS

(71) Applicant: Thermaco, Inc., Asheboro, NC (US)

(72) Inventors: William C. Batten, Asheboro, NC (US); Bruce Kyles, Asheboro, NC (US); Jan Fischer, Asheboro, NC (US); Randolph Batten, Asheboro, NC (US)

(73) Assignee: Thermaco Incorporated, Asheboro, NC (US)

( * ) Notice: Subject to any disclaimer, the term of this patent is extended or adjusted under 35 U.S.C. 154(b) by 0 days.

(21) Appl. No.: 16/753,498

(22) PCT Filed: Oct. 31, 2018

(86) PCT No.: PCT/US2018/058346
§ 371 (c)(1),
(2) Date: Jul. 9, 2020

(87) PCT Pub. No.: WO2019/089686
PCT Pub. Date: May 9, 2019

(65) Prior Publication Data
US 2021/0164215 A1 Jun. 3, 2021

Related U.S. Application Data (60) Provisional application No. 62/608,921, filed on Dec. 21, 2017, provisional application No. 62/579,430, filed on Oct. 31, 2017.

(51) Int. Cl.
*E03F 5/16* (2006.01)
*G01F 23/292* (2006.01)
(Continued)

(52) U.S. Cl.
CPC ............ *E03F 5/16* (2013.01); *G01F 23/2928* (2013.01); *G01F 23/2962* (2013.01); *C02F 1/40* (2013.01); *C02F 2209/42* (2013.01)

(58) Field of Classification Search
CPC .... E03F 5/16; G01F 23/2928; G01F 23/2962; C02F 1/40; C02F 2209/42; C02F 2209/02; G01B 17/02; G01B 11/0608
(Continued)

(56) References Cited

U.S. PATENT DOCUMENTS

| 978,889 A | 12/1910 | Imhoff ........................ 210/532.2 |
| 1,200,951 A | 10/1916 | Kelly, Jr. ...................... 210/540 |

(Continued)

FOREIGN PATENT DOCUMENTS

| DE | 199 07 840 A1 | 8/2000 |
| DE | 102 20 126 A1 | 11/2003 |

(Continued)

OTHER PUBLICATIONS

Merriam Webster Dictionary, see https://www.merriam-webster.com/dictionary/conduit, definition of conduit (Year: 2022).*
(Continued)

*Primary Examiner* — Nam X Nguyen
*Assistant Examiner* — Ekandras. Miller-Cruz
(74) *Attorney, Agent, or Firm* — MacCord Mason PLLC (57) ABSTRACT

An apparatus having a layer of fats, oils and grease (F.O.G) on water includes a tank having an inlet and an outlet. The inlet connects to a source of F.O.G.-laden effluent and the outlet connects to a sewer pipe so that the outlet defines a normal static water level for F.O.G. and effluent in the tank. A sensor mounted above the static water level determines a distance from the sensor to a top of F.O.G. within the tank, so that a thickness of the F.O.G. in the tank can be determined. If the sensor is LIDAR, sensing may be at about 940
(Continued)

nm. When the F.O.G. is sensed to be above a threshold, the apparatus generates signals to remove the F.O.G. Ultrasonic sensing may be used. Preferably, the sensor is mounted far enough above the static water level so the distance between the sensor and the liquid surface is filled with air. More preferably, the sensor is far enough above the static water level so that the top of the F.O.G. does not touch the sensor even as the top of the F.O.G. rises above the static water level.

23 Claims, 9 Drawing Sheets

(51) Int. Cl.
  *G01F 23/2962* (2022.01)
  *C02F 1/40* (2023.01)
(58) Field of Classification Search
  USPC .......................................................... 210/86
  See application file for complete search history.

(56) References Cited

U.S. PATENT DOCUMENTS

| | | | |
|---|---|---|---|
| 1,760,229 A | 5/1930 | Arndt | 210/532.1 |
| 2,213,458 A | 9/1940 | Buckley | 210/6 |
| 2,226,968 A | 12/1940 | Clerici | 210/6 |
| 2,338,971 A | 1/1944 | Ross | 182/9 |
| 2,846,073 A * | 8/1958 | Hopper, Sr. | B01D 17/0208 210/256 |
| 3,025,962 A | 9/1958 | Williams | 210/86 |
| 3,048,277 A | 8/1962 | Bland | 210/532.1 |
| 3,224,593 A | 12/1965 | Nebolsine | 210/519 |
| 3,433,385 A | 3/1969 | Metivier | 220/293 |
| 3,662,918 A | 5/1972 | Crawford et al. | 220/85 |
| 3,761,929 A | 9/1973 | Wyatt | 149/87 |
| 3,923,655 A | 12/1975 | McKinney | 210/83 |
| 4,038,186 A | 7/1977 | Potter et al. | 210/92 |
| 4,051,024 A | 9/1977 | Lowe et al. | 210/30 |
| 4,113,617 A | 9/1978 | Bereskin et al. | 210/540 |
| 4,235,726 A | 11/1980 | Shimko | 210/523 |
| 4,268,392 A | 5/1981 | Hayes | 210/532.1 |
| 4,372,854 A | 2/1983 | Szereday et al. | 210/242.3 |
| 4,385,986 A | 5/1983 | Jaisinghani et al. | 210/123 |
| 4,406,789 A | 9/1983 | Brignon | 210/519 |
| 4,807,201 A * | 2/1989 | Fryda | E21B 47/06 367/908 |
| 4,832,711 A | 5/1989 | Christel, Jr. et al. | 55/20 |
| 4,972,709 A | 11/1990 | Bailey, Jr. et al. | 73/290 |
| 5,021,153 A | 6/1991 | Haws | 210/521 |
| 5,492,619 A | 2/1996 | Batten | 210/86 |
| 5,705,055 A | 1/1998 | Holloway, Jr. et al. | 210/86 |
| 5,946,967 A | 9/1999 | Russell | 73/290 |
| 6,014,076 A | 1/2000 | Luzzader | 340/521 |
| 6,108,212 A | 8/2000 | Lach | 174/255 |
| 6,251,286 B1 | 6/2001 | Gore | 210/744 |
| 6,619,118 B1 | 9/2003 | Keck | 73/304 C |
| 6,879,935 B2 | 4/2005 | Keck | 702/168 |
| 7,297,284 B2 | 11/2007 | Owen | 210/540 |
| 7,635,854 B1 * | 12/2009 | Babin | G01F 23/2928 250/573 |
| 8,850,883 B2 | 10/2014 | Dockendorff et al. | |
| 10,215,612 B2 | 2/2019 | Dockendorff et al. | |
| 2005/0029201 A1 | 2/2005 | Rodis | 210/744 |
| 2005/0109682 A1 | 5/2005 | Mazurek et al. | 210/86 |
| 2005/0178721 A1 | 8/2005 | Lombardi, II | 210/532.2 |
| 2007/0251879 A1 | 1/2007 | Batten et al. | 210/532.1 |
| 2009/0071243 A1 | 3/2009 | Camp | 73/204.2 |
| 2009/0220380 A1 * | 9/2009 | Brown | A01K 63/006 422/68.1 |
| 2012/0281096 A1 * | 11/2012 | Gellaboina | G01F 23/2962 348/163 |
| 2015/0002658 A1 | 1/2015 | Jaw et al. | |
| 2016/0122209 A1 * | 5/2016 | Newman, Jr. | B01D 17/0214 210/744 |
| 2016/0207801 A1 * | 7/2016 | Stronczek | C02F 1/487 |
| 2017/0072340 A1 * | 3/2017 | Mantyla | B01D 21/0003 |
| 2017/0082478 A1 | 3/2017 | LaBarge et al. | |

FOREIGN PATENT DOCUMENTS

| | | | |
|---|---|---|---|
| EP | 0 329 374 A1 | 8/1989 | |
| EP | 1816107 A1 * | 8/2007 | C02F 1/008 |
| GB | 2 547 044 A | 8/2017 | |
| SE | 1230114 A1 * | 5/2014 | G01F 23/296 |
| WO | WO 2011/162790 | 12/2011 | |

OTHER PUBLICATIONS

Rigid_definition_NPL.pdf (Year: 2022).*
Hollow_definition_NPL.pdf (Year: 2022).*
Sensor Smartserv Grease Brochure, Intelligent Grease Management, p. 1-4.
VL53L1 a Flight Sense ™ Product ST life. Augmented 2017 STMicroelectronics p. 1-3
VL83L0X World Smallest Time-of-Flight ranging and gesture detection sensor ST life.augmented 2016 STMicroelectronics, p. 1-40
Samenviro Eco-Management & Technology; Technical Certificate "Grease Trap" Technical Requirements #"TY 4859-003-59325378-2008"; Samara; 2010.
European Search Report for European Application No. 18873291.1 dated Jul. 13, 2021.

* cited by examiner

NON-CONTACT SENSOR FOR DETERMINING A F.O.G. LEVEL IN A SEPARATOR, INCLUDING ULTRASONICS

BACKGROUND OF THE INVENTION

Historically, grease traps have been used in restaurants and other commercial facilities to limit the amount of fats, oils and grease (F.O.G.) and solid waste that is carried into sewer systems via waste water. Typical grease traps are either passive grease traps or automatic grease traps (also called a grease separator or interceptor). Examples of passive traps are the Trapzilla® line of traps sold by Thermaco, Inc. of Asheboro, N.C. disclosed in U.S. Pat. No. 7,367,459 to Batten et al. entitled Passive Grease Trap Using Separator Technology and U.S. Pat. No. 7,641,805 to Batten et al. entitled Passive Grease Trap With Pre-Stage For Solids Separation. Thermaco also offers a Big Dipper® line of Automatic grease separators. Passive grease traps are usually only emptied of the F.O.G. periodically and therefore F.O.G. tends to build up inside the tank. Passive grease traps typically include a tank with an inlet that brings in waste water and an outlet that carries water out of the tank from a low point of the tank. Lightweight F.O.G. rises to the top of the water in the tank and heavier solids settle in the bottom of the tank, a process of stratification. As the amount of F.O.G. that accumulates in the tank becomes excessive, water flushing through the tank can disrupt the F.O.G. that has already separated, causing the F.O.G. to be entrained with the water and become expelled with grey water. This is especially true as the tank fills up with F.O.G., so that the F.O.G./water interface is closer to the grease trap bottom. Grease interceptors also use stratification, and when the thickness of a grease mat in an interceptor reaches a certain level, skimming is needed.

Determining when to pump out the passive grease traps or to actuate a skimmer in a grease interceptor to remove accumulated F.O.G. has been a problem for the art. Typically, to be on the safe side, grease traps and other passive separation devices have been pumped based upon a schedule (for example once a month or once every two weeks). If not much F.O.G. has accumulated when pumping occurs, the pumping may be a waste since more time could have elapsed before pumping. If too much F.O.G. accumulates before the trap is pumped, then there is a risk of F.O.G. becoming re-entrained in grey water and discharged to the sewer pipe, defeating the purpose of F.O.G. separation. Similar issues of when to skim also arise in an active grease separator or interceptor.

It is known to locate thermocouples or other temperature sensors in the separator to determine the amount of F.O.G. stored in the separator container, as taught in U.S. Pat. No. 7,828,960 to Batten et al, entitled F.O.G. Separator Control, the entire disclosure of which is incorporated herein by reference.

Other ways to address the issues of determining when to remove a stratified F.O.G. mat without using sensors are disclosed in U.S. Patent Publication US-2015-0308094-A1, the entire disclosure of which is incorporated herein by reference.

Kingspan Environmental Service, 180 Gilford Road, Portadown, Co. Armagh., Northern Ireland BT63 5LF offers Kingspan Sensor's Smart Sery Grease solution, which uses a sensor of unknown technology.

Sensors like capacitance sensors that are immersed in the effluent and/or F.O.G. encounter issues with fouling, including by biofilm buildup, so avoiding immersion is a benefit.

There remains a need in the art to be able to reliably sense when the F.O.G. mat reaches a threshold at which F.O.G. removal by pumping or skimming is warranted.

SUMMARY OF THE INVENTION

The present invention fulfills one or more of these needs in the art by providing an apparatus for containing an F.O.G. layer on water, including a tank having an inlet and an outlet. The inlet is configured to connect to a source of F.O.G.-laden effluent and the outlet is configured to connect to a sewer pipe so that the outlet defines a normal static water level for F.O.G. and effluent in the tank. A sensor mounted above the static water level is configured to determine a distance from the sensor to a top of F.O.G. within the tank, so that a thickness of the F.O.G. in the tank can be determined.

The sensor can be a LIDAR sensor, such as a LIDAR sensor operating at about 940 nm. The sensor may be held in place by magnets.

The tank may have an extension collar above a main body of the tank, with the sensor mounted in the extension collar. The extension collar may be generally cylindrical and formed of four arc segments molded of thermoplastic plastic, such as polyethylene.

The sensor preferably includes a sensor unit mounted in a low part of the extension collar and a battery and electronics unit mounted at a higher part of the extension collar. The electronics unit desirably includes a transmitter to transmit a signal indicative of F.O.G. level in the tank. The sensor and battery and electronics unit may be linked by a coiled electrical cord and a separate tether having tensile strength sufficient to pull the sensor upwardly through the extension collar for service.

In one embodiment the tank has a tank top, an extension collar extending upward and supported by the tank top, and an extension top resting on the extension collar. The extension top, extension collar and tank top have aligned openings enabling a suction pipe to pass through the aligned openings for suctioning of F.O.G. A cover fits on the opening in the extension top to close the aligned openings when suctioning is not needed.

The invention may also be considered as a method of sensing an F.O.G. level in a tank having an inlet and an outlet, in which the inlet is configured to connect to a source of F.O.G.-laden effluent and the outlet is configured to connect to a sewer pipe so that the outlet defines a normal static water level for F.O.G. and effluent in the tank. The method includes sensing a distance from a fixed sensor and a top of F.O.G. above the static water level within the tank and using the sensed distance to determine if the amount of F.O.G in the tank exceeds a threshold warranting F.O.G. removal from the tank.

F.O.G. removal may include actuating a skimmer. F.O.G. removal may include pumping F.O.G. from the tank. The sensing may be LIDAR sensing, particularly LIDAR sensing at about 940 nm.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

F.O.G. has a specific gravity of about 0.88 and water has a specific gravity of 1.00, so for every ten inches of F.O.G. build up in a trap, the F.O.G. displaces 8.8 inches of water while simultaneously projecting upward above the original, normal static water level 1.2 inches. Applicant has found that using this known differential property and the known distance from a sensor positioned above the liquid level to the top of the F.O.G. stratum, a determination can be made of how much F.O.G. is in the trap.

Various sensor technologies can be used, such as laser sensors (popular for golf range finders and a host of industrial uses) and ultrasonic sensors (popular with robotics both industrial and hobbyist applications). A suitable ultrasonic sensor is non-contact and non-immersed, looking at sound bounce back to discern the distance to the surface only. The ultrasonic sensor can be an electronic module located at the top of the extension collar containing the sensor and cellular electronics. Putting the sensor and cellular electronics in a single module reduces cost and keeps the sensor electronics out of the high temperature and humidity area near the contained F.O.G. and effluent. Using a modular cellular approach allows changing among different wireless service providers and standards. The ultrasonic transducer and temperature probe (such as a thermocouple) may be at the bottom of the extension collar. The ultrasonic transducer may be temperature rated to 90 C (194 F) and can use a 3 or 4 wire shielded cable, any length. The transducer mounting could be normal (downward facing) or rotated 90 degrees (horizontal facing with deflector) depending on the performance needs of the high temperature and humidity environment. An ultrasonic signal can be generated horizontally from a transducer that is remote from the source of potentially deleterious heat and humidity and then directed downward to the F.O.G. layer by a deflector. The ultrasonic transmitter and receiver can be separate. Since the speed of sound in air varies with temperature, a temperature sensor allows compensation for changes in the time of travel of the ultrasonic signal caused by a temperature variation. The ultrasonic signal can be subject to a dynamic gain analysis to discern the F.O.G. from other floating objects.

Suitable ultrasonic sensors may be available from Senix Corporation, 10516 Route 116, Suite 300, Hinesburg, Vt. 05461 USA.

Sonar sensors may be used but are not presently preferred because sonar sensors that are waterproof, have a high enough range, and high enough accuracy while taking account the humidity are expensive. Computer vision could be another choice: a video sensor aimed at the top surface of the F.O.G. stratum could capture an image, and a computer associated with the electronics unit could compare the image with an image taken of the same scene when the water is at the normal static water level with minimal F.O.G. Computer vision (and/or artificial intelligence) could then detect the height difference by comparing pictures when F.O.G. has accumulated. The less of the inside wall of the trap that the device "sees" means the higher the liquid level inside the tank caused by accumulated F.O.G.

One sensor option uses LIDAR, particularly LIDAR operating at about the 940 nm wavelength.

The sensor technology includes the sensor, control board(s), software controls and housing(s). Moisture-resistant properties can be applied to the sensor technology, by way of an enclosing housing or a conformal coating.

The sensor may be located 300 mm to 1000 mm above the static water level, with the distance between the sensor and the liquid surface being filled with air. The sensor may be hung/attached onto an expansion collar or on the underside of a top cover (like a manhole cover) of a tank or trap in which the stratification of F.O.G. above the water takes place.

Figure 1:
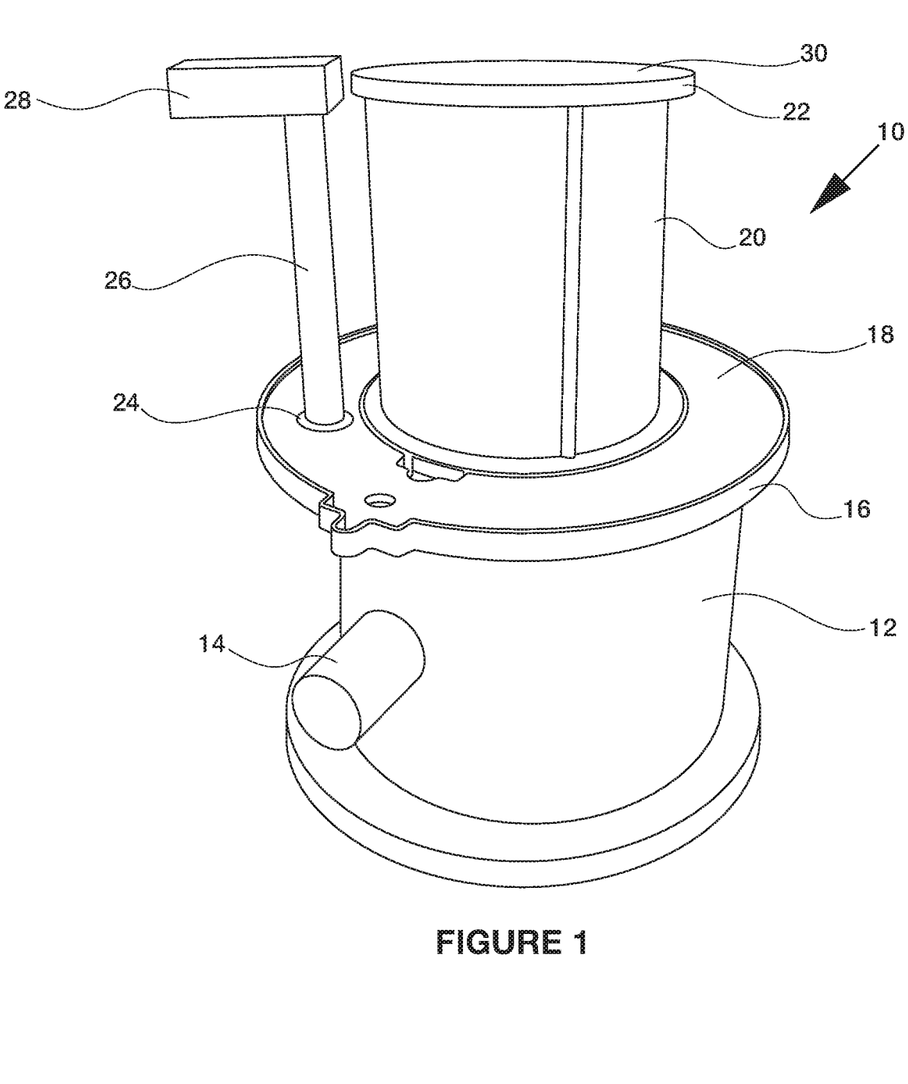
FIG. 1 is a perspective view of a passive grease trap equipped with a sensor in accordance with an embodiment of the invention.

FIG. 1 shows an embodiment 10 of a separator equipped with the sensor technology. A tank 12 has an inlet 14 and outlet (not shown). The height of the outlet usually defines the normal static water level. The inlet 14 receives effluent containing F.O.G. (and likely solid kitchen waste). The tank 12 has sufficient volume to slow the effluent flow so the less dense F.O.G. has time to rise above the water in the effluent and collects to form a mat within the tank 12. The outlet is usually provided with an invert, so that the water exiting the tank 12 comes from the water that is at a low part of the tank, below the accumulated F.O.G. mat. The tank 12 may be installed below ground, such as in a parking lot of a restaurant. A widened tank top 16 supports a ring-shaped lid 18 and an extension collar 20. The collar 20 supports a top ring 22 and a ground-access cover 30. Extension collars for underground mounts are further disclosed in U.S. Pat. No. 7,540,967 to Batten et al. and U.S. Pat. No. 9,528,258 to McBride et al., and the disclosures of both of those patents are hereby incorporated herein by reference.

A tube 26 extends between an electronics unit 28 just below grade and an opening 24 in lid 18. The electronics unit 28 contains electronics to analyze data from a sensor in a sensor housing 32 (shown in FIG. 2) positioned at the bottom of the tube 26 and directed downward into the tank 12. The electronics unit 28 may include batteries (or other power supply) and a communication link such as a cell phone connection, WiFi, NFC, Bluetooth or the like, so that information about the the grease mat can be sent to a pumping service to come to pump out the tank. Information gleaned from the sensor may be transmitted to a pumper or to a monitoring station using technology as disclosed in International Patent Publication WO 2017/035220, the entire disclosure of which is incorporated herein by reference.

Pumping involves removing the lid 30, extending a suction hose into the tank and pumping the F.O.G. from the tank 12 to a truck that transports the F.O.G. to a rendering plant or other disposal facility. Pumping may also include pumping solids that have accumulated at the bottom of the tank.

Figure 2:
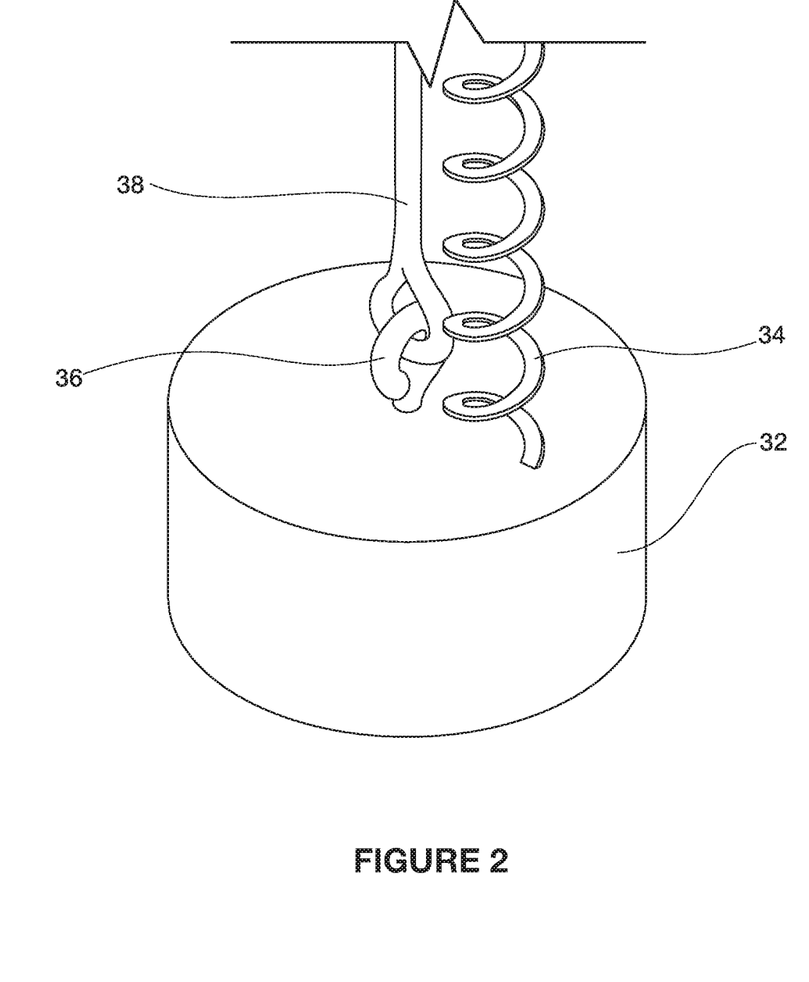
FIG. 2 is a top perspective view of a sensor housing for the embodiment of FIG. 1.
Figure 3:
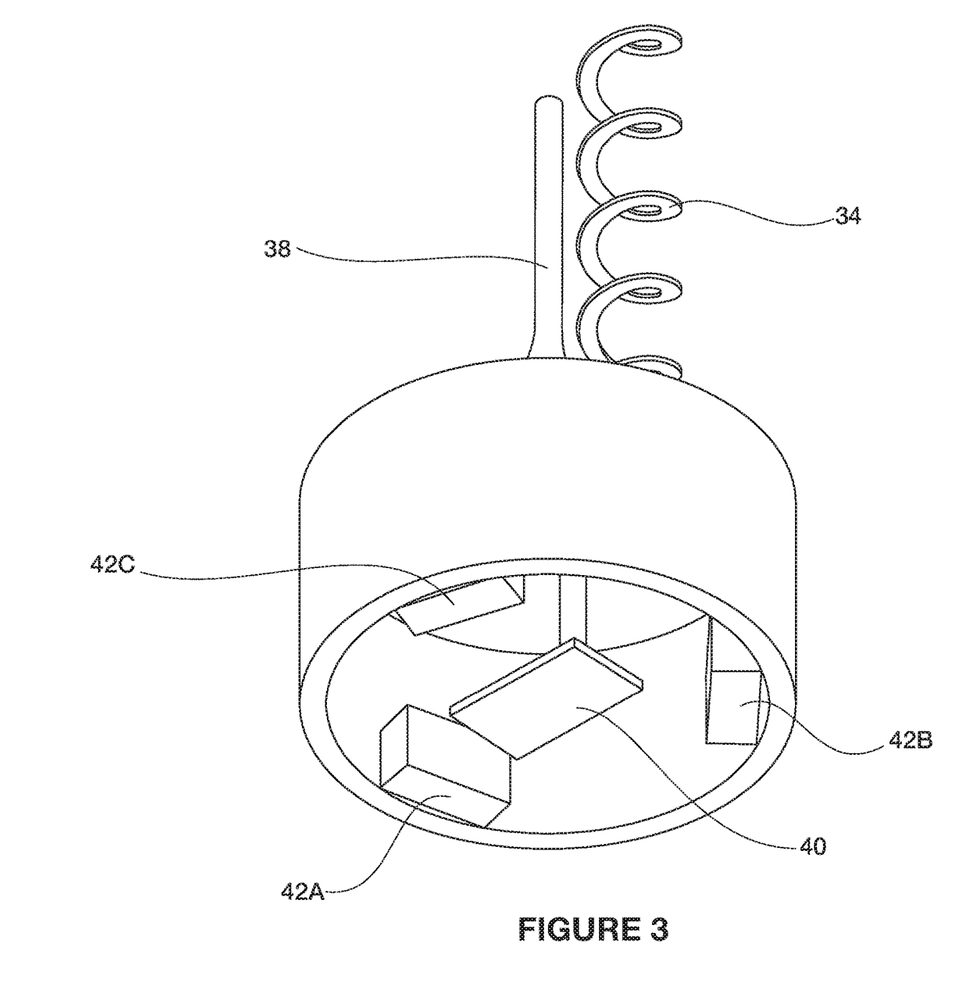
FIG. 3 is a bottom perspective view of a sensor housing for the embodiment of FIG. 1.

The sensor housing 32 is seen in FIGS. 2 and 3. The housing 32 fits within the tube 26, lowered from the top of the tube to rest on a ledge at about the height of the lid 18.

Ferromagnetic metal fixed in place at the lid 18 and magnets 42A, 42B and 42C on the sensor housing 32 hold the housing in a fixed position at the lid. The fixed position sets a reference point for the sensor, so that the distance traversed by the beam of the sensor, such as a Lidar sensor or ultrasonic sensor, can be determined by measuring the round-trip time of flight from the known position of the sensor to the variable height of the top of the F.O.G. mat. A Lidar sensor 40 is located in the housing 32, with an attached, coiled data and power cable 34. A similar mounting can be used for an ultrasonic sensor. The housing 32 has an attachment 36 and a connected tether 38. The tether is strong enough to be pulled upward, enabling the housing 32 to break free of the hold of the magnets and be pulled upward through the tube 26 if servicing is needed.

The sensor 40 directs a pulse downward into the tank 12, and the pulse is reflected by F.O.G. within the tank. The time interval between the sensor's sending of the pulse and the sensor's receipt of the reflected pulse is proportional to the distance from the sensor to the top of the F.O.G. mat. Data indicative of that time interval is sent to the electronics unit 28 for analysis.

The analysis of Lidar data can include subtracting the time of flight when the tank has zero F.O.G. mat (which can be a stored value) from the measured time of flight. If the result exceeds a threshold that is characteristic of the tank, the data indicates that the F.O.G. mat is thick enough that pumping is warranted, so a signal can be sent to the pumping service to come pump the tank. If the data indicates that the mat thickness is too large, an urgency alarm can be added to the signal to the pumping service. Also within the scope of the invention is for the electronics unit to send a signal that pumping is not needed if the F.O.G. mat is determined not to be thick enough to warrant pumping. Similar analysis can be used with an ultrasonic sensor.

The sensing of the F.O.G. thickness can be repeated continually, to provide continual monitoring of when pumping or other removal is needed. A schedule of sensing the thickness may be once a day, once a week or some other schedule, depending on the needs of the installation. The sensing can be triggered by a signal from a remote communication source, or by a timer or other mechanism internal to the electronics unit 28.

Figure 4:
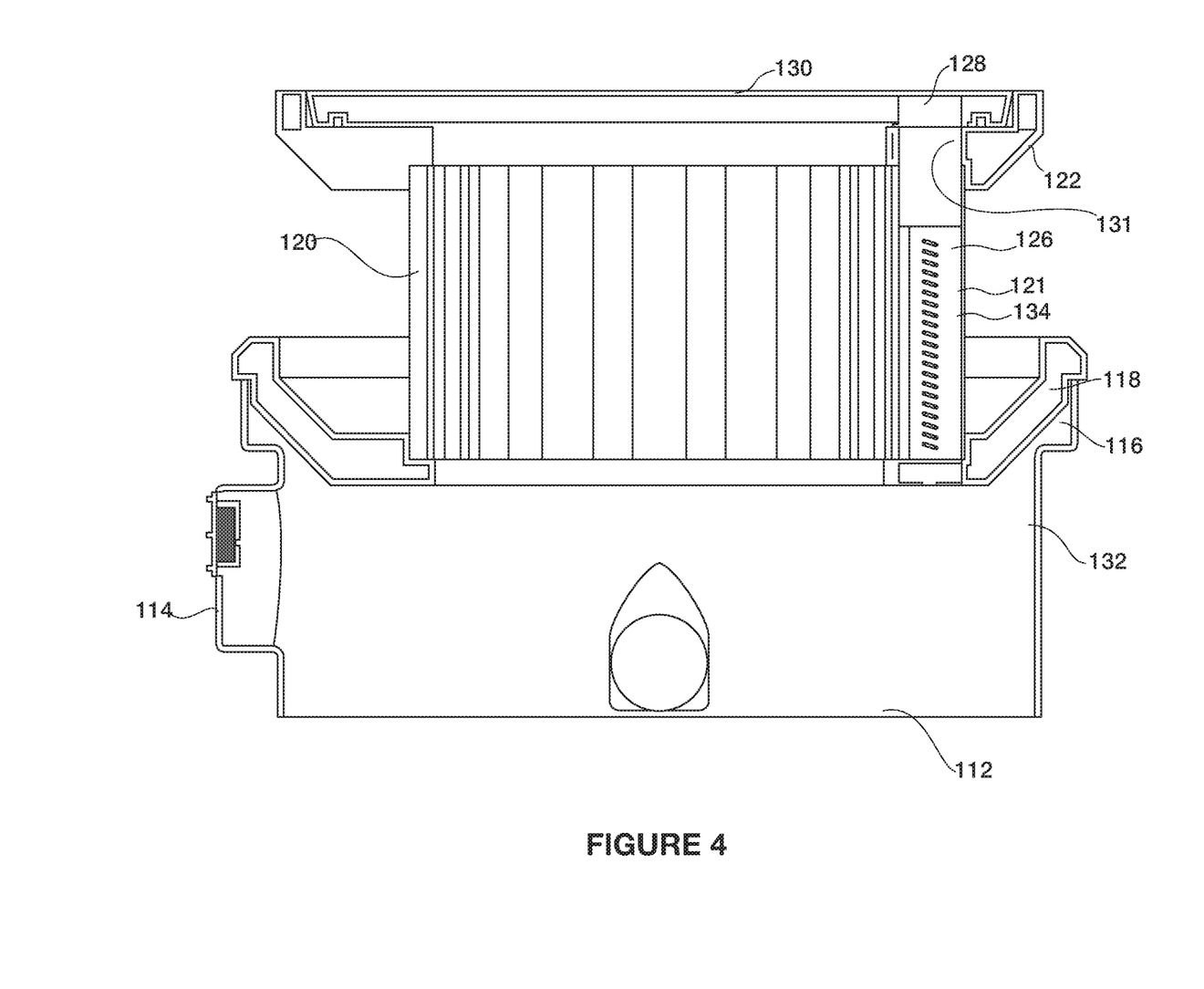
FIG. 4 is a partial, sectional view of a second embodiment.

FIGS. 4-7 show an alternate embodiment, differing in the construction of the extension collar and the tube configuration for the sensor housing. In FIG. 4 the lower part of the tank 112 is omitted. The tank 112 has an inlet 114 and outlet (not shown). The inlet receives effluent containing F.O.G. (and likely solid kitchen waste) The tank 112 has sufficient volume to slow the effluent flow so the lower-density F.O.G. rises above the water in the effluent and collects to form a mat within the tank 112. The outlet is usually provided with an invert, so that the water exiting the tank 112 is from the water at a low part of the tank, below the accumulated mat. The tank 112 may be installed below ground, such as in a parking lot of a restaurant. A widened tank top 116 supports a ring-shaped lid 118 and an extension collar made of arc segments 120 and 121. The collar supports a top ring 122 and a ground-access cover 130.

The extension collar is made up of four extruded sections (arcs) that interlock together to form a generally cylindrical shape with vertical flutings or corrugations. The extruded sections are knocked down for shipping and field assembled to create a cylinder. The collar includes three identical arcs 120 and a fourth arc 121. The arc 121 differs from the three arcs 120 in that it has the tube 126 for the sensor assembly. The edges of adjacent arcs join one another with an interlock like a tongue and groove construction.

The tube 126 can also tie the pieces above and below it together for alignment of the tube. After assembly of the arcs, the collar is cut to length. The desired length will be specific for an installation, but will be sufficient to extend from the top surface of the lid 118 to a height to receive a top ring 122 that supports a cover 130, typically ground level. The cover 130 can be bolted into place on the top ring so it is removable for F.O.G. pumping or servicing of the sensor unit.

The tube 126 has a stainless steel or other ferromagnetic metal ring 143 (see FIG. 5) below its bottom and secured to the tank top 118 for magnetic attraction to magnets 142 in the sensor housing 132. The housing 132 has a coiled data and power cable 134 extending to a cylindrical electronics unit 128. A ring 129 on the housing 132 causes it to rest at a desired height in the tube 126, typically on the top ring 122 with the portion of the electronics unit above the ring 129 being short enough that it can be covered and protected by the cover 130. An antenna for cell phone connection, WiFi, NFC, Bluetooth or the like is positioned at the top of electronics unit 128, the top of which itself nests within a space 131 formed in the top ring 122.

Figure 5:
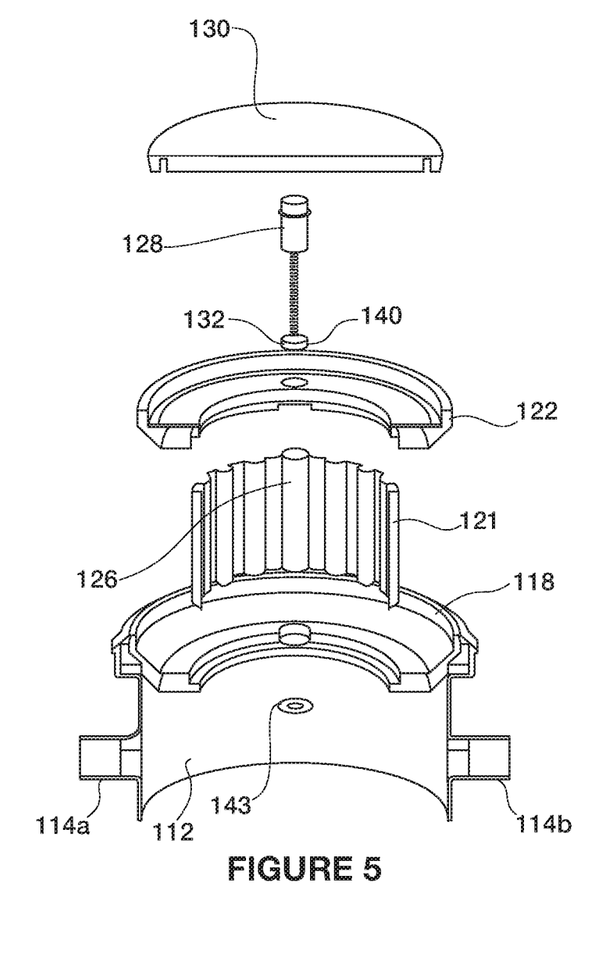
FIG. 5 is a partial, exploded sectional view of the second embodiment.
Figure 6:
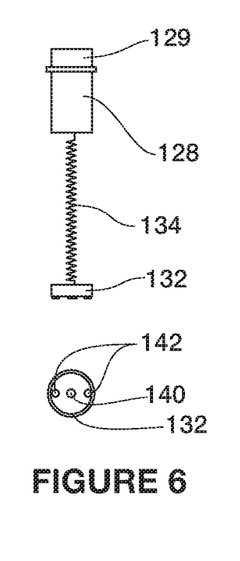
FIG. 6 is a partial view of the sensor and electronics assembly for the second embodiment.
Figure 7:
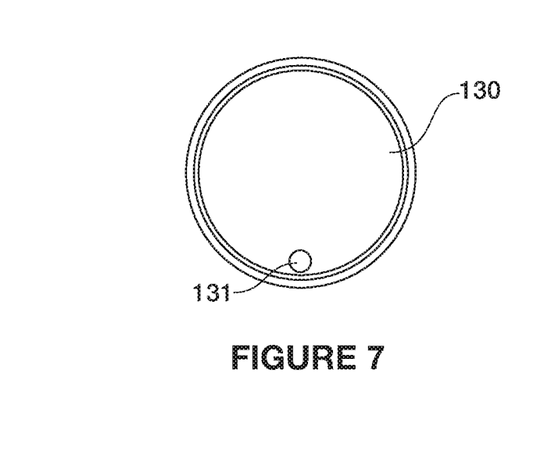
FIG. 7 is a bottom view of a cover for the passive grease trap in accordance with the second embodiment.

The Lidar unit (sensor and electronics unit) can be shipped with the unit when it is new or retrofitted at a later date. Once the top cover 130 is removed, the top of the Lidar unit can be pulled out of its tube 126 for servicing, such as to replace batteries. A cable or other line, like the tether 38 of the embodiment of FIG. 1, can be used to pull the sensor up the tube 126. To install Lidar in a unit that is not equipped with it, the top cover is removed and the tube is exposed. The sensor housing 132 is lowered into the tube 126 and is held in place onto the stainless washer 143 by the magnets 142 at the bottom of the tube 126.

Lidar sensors with wavelengths in the mid to far IR range have been found not to be suitable because oil absorbs radiation at those wavelengths.

A preferred LIDAR sensor operates at 940 nm for the VL53L0X Lidar chip. The VL53L0X is a new generation Time-of-Flight (ToF) laser-ranging module. It can measure absolute distances up to 2 m. Another usable chip is the VL53L1, which is a Time-of-Flight (ToF) laser-ranging miniature sensor. This chip integrates a SPAD (Single Photon Avalanche Diodes) array, physical infrared filters and optics. Both sensors are available from STMicroelectronics NV of Geneva, Switzerland (st.com). The VL53L0x does not accurately read a water level, but that is immaterial because the only time there will not be at least a film of oil on the surface of the liquid in the trap is when the unit is first installed.

The use of a converter circuit may be needed to convert the I2C signal to another digital signal with a longer communications range.

Since the VL53L0x chip has a very short range when dealing with oils, it is preferably mounted at about 10 inches from the static water level. Mounting the sensor and its electronics in a tube separate from the main central opening of the trap reduces the risk that a pumper's suction equipment could collide with it.

Similar mountings and analysis can be used with an ultrasonic sensor. An ultrasonic transducer and temperature probe (such as a thermocouple) may be at the bottom of the extension collar. The ultrasonic transducer may be temperature rated to 90 C (194 F) and can use a 3 or 4 wire shielded cable, any length. The transducer mounting could be normal (downward facing) or rotated 90 degrees (horizontal facing with deflector) depending on the performance needs of the high temperature and humidity environment. An ultrasonic signal can be generated horizontally from a transducer that is remote from the source of potentially deleterious heat and humidity and then directed downward to the F.O.G. layer by a deflector. The ultrasonic transmitter and receiver can be separate. Since the speed of sound in air varies with temperature, a temperature sensor can be used to allow compensation for changes in the time of travel of the ultrasonic signal caused by temperature variations. The ultrasonic signal can be subject to a dynamic gain analysis to discern the F.O.G. from other floating objects. Suitable ultrasonic sensors may be available from Senix Corporation, 10516 Route 116, Suite 300, Hinesburg, Vt. 05461 USA.

When the sensing system is installed in an automatic grease trap or interceptor that uses active skimming for F.O.G. removal, the sensing that the thickness of the F.O.G. layer exceeds a threshold can be used to activate skimming. As used in this application, "skimming" includes other ways of taking the F.O.G. off the top, including opening spouts that drain the F.O.G. (see U.S. Pat. No. 7,186,346 for examples), pumping the F.O.G. (see U.S. Pat. No. 6,517,715 for an example), or other active methods. More examples and details of a F.O.G. removal assembly may be found in U.S. Pat. No. 6,800,195 to Batten et al. and U.S. Pat. No. 7,208,080 to Batten et al. which are both herein incorporated by reference in their entireties. Other types of skimmers can be used in the invention, too, including but not limited to: belt skimmers, examples of which can be seen in U.S. Pat. No. 7,427,356 to Chapin and U.S. Pat. No. 7,296,694 to Weymouth; skimmers that include one or more rotating cylinders that partially or completely submerge, one example as is shown in U.S. Pat. No. 4,051,024 to Lowe et al; skimmers with an absorptive affinity for F.O.G and/or skimmers that include non-cylindrical grease collectors pivoting to come into contact with F.O.G. for removal, one example as seen in U.S. Pat. No. 4,235,726 to Shimko.

The tank and its attachments preferably have an International Protection Rating of IP 65.

The sensor can also be installed in conventional concrete grease traps.

An added feature can include a data analysis module associated with the electronics unit to deal with deviations from normal static water levels. The data analysis can include distinguishing levels of normal flow events from levels created from downstream full or partial plumbing obstructions. These two events, like accumulations of F.O.G., result in sensor readings that are higher than the normal static water level (which is usually determined by the height of the outlet from the trap). Rising levels that are due to normal flow events are transitory and can be distinguished by taking several readings over a period of time and disregarding those that show a high level that soon returns to the normal level.

Changes that are due to downstream obstructions are more permanent and will continue over several readings. A level that rises faster than is possible for a F.O.G. accumulation to cause would indicate a downstream obstruction, permitting the signaling of an alarm of that potential condition. Alternatively, if data about a downstream partial obstruction is available from another source, that data can be added to the analysis of what the F.O.G. level is in the tank, enabling a rise in level to be disregarded as not a thickening of the F.O.G. level.

FIGS. 8-11 show an alternate embodiment, differing in the construction of the extension collar and the tube configuration for the sensor housing. In these figures the tank 112 is omitted, showing the ring-shaped lid 218, top ring 222 and extension collar. The tank, inlet and outlet are configured as described above.

Figure 8:
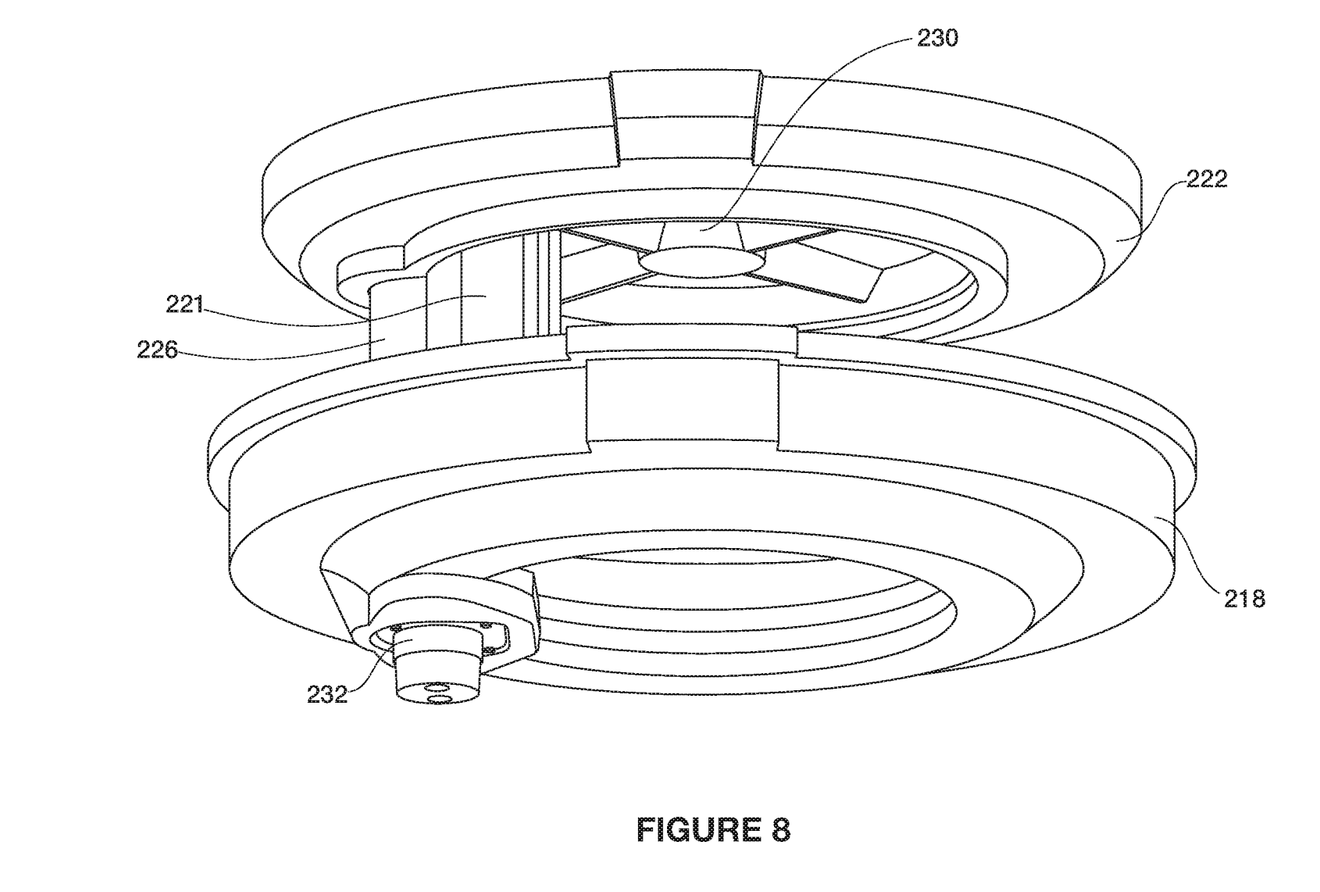
FIG. 8 is a lower partial perspective view of components of a third embodiment.
Figure 9:
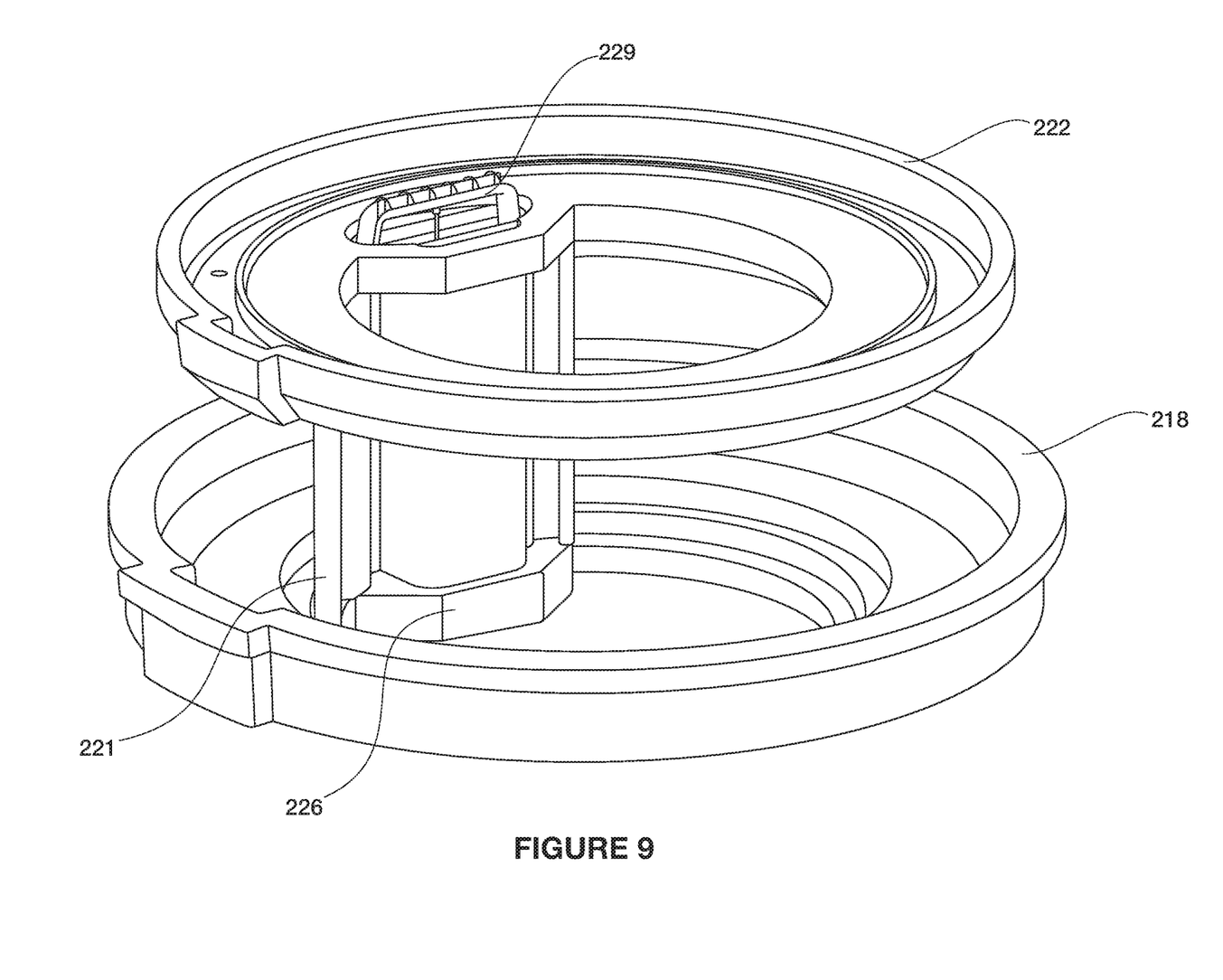
FIG. 9 is an upper partial perspective view of components of a third embodiment.
Figure 10:
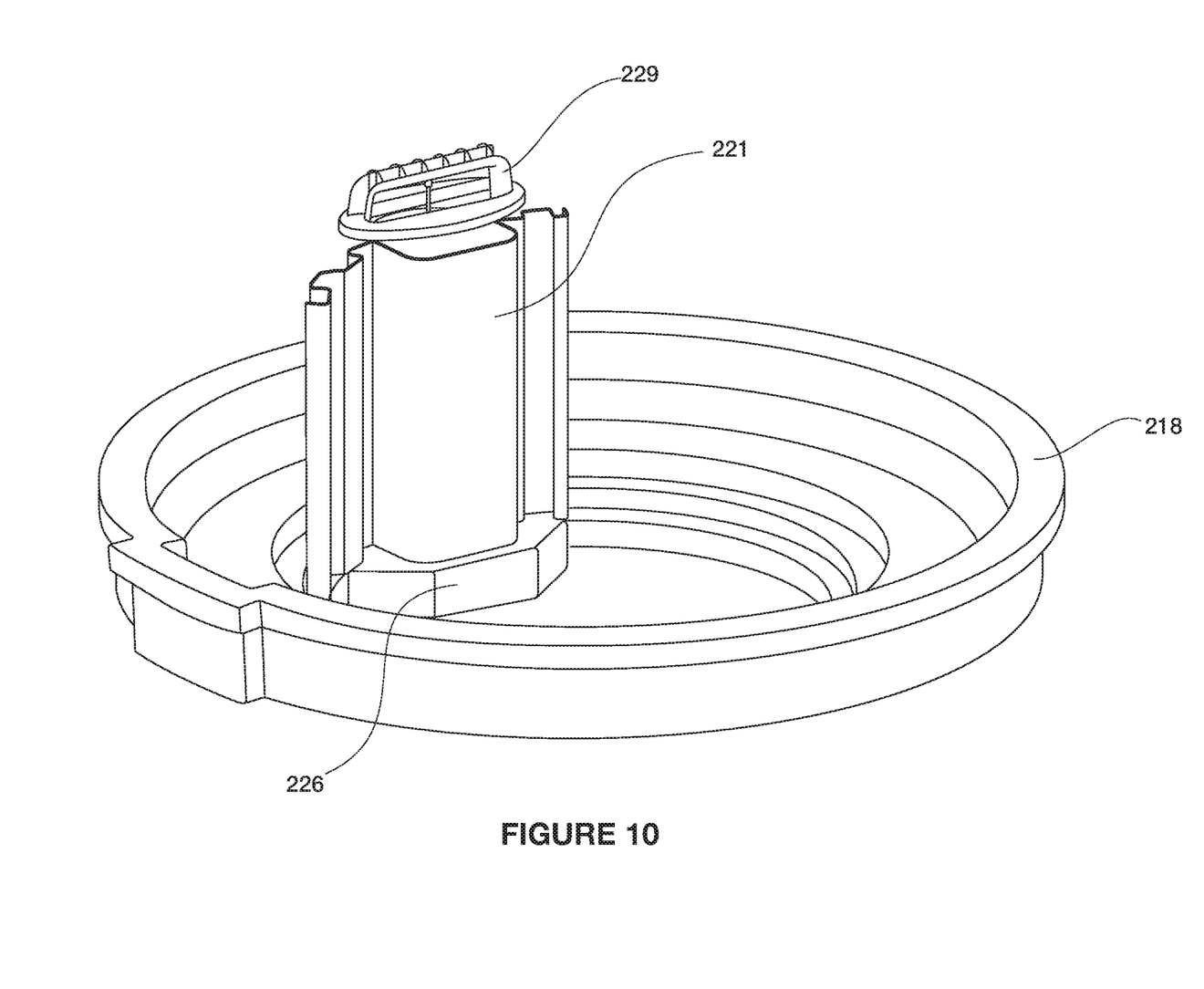
FIG. 10 is an upper partial perspective view of fewer ones of the components of a third embodiment.
Figure 11:
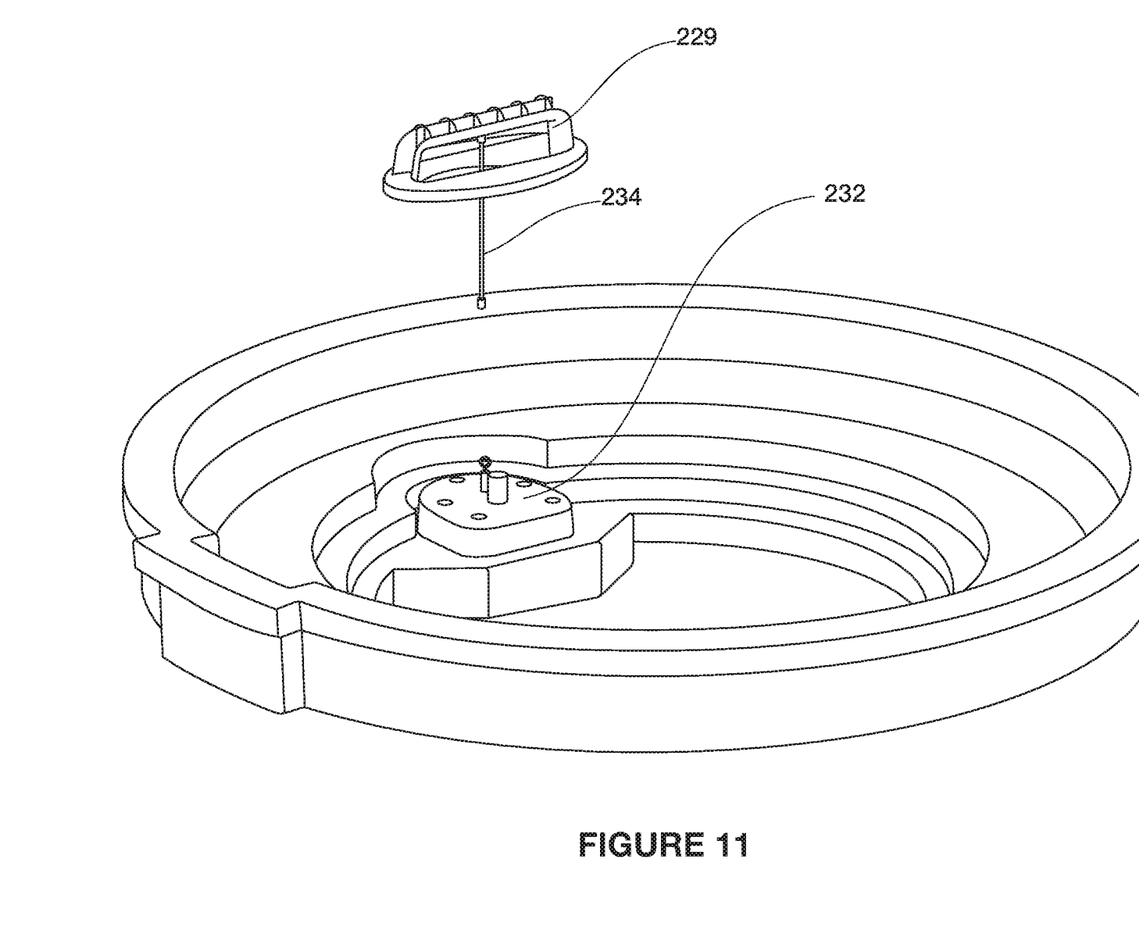
FIG. 11 is an upper partial perspective view of even fewer of the components of a third embodiment.

As in the embodiment of FIGS. 4-7 the extension collar is made up of four extruded sections (arcs) that interlock together to form a generally cylindrical shape with vertical flutings or corrugations, although only arc section 221 is shown in FIGS. 8 to 10. The extruded sections are knocked down for shipping and field assembled to create a cylinder. The collar includes three identical arcs and a fourth arc 221. The arc 221 differs from the three arcs in that it has the tube 226 for the sensor assembly. The edges of adjacent arcs join one another with an interlock like a tongue and groove construction.

The tube 226 can also tie the pieces above and below it together for alignment of the tube. After assembly of the arcs, the collar is cut to length. The desired length will be specific for an installation, but will be sufficient to extend from the top surface of the lid 218 to a height to receive a top ring 222 that supports a cover 230, typically ground level. The cover 230 can be bolted into place on the top ring 22 so it is removable for F.O.G. pumping or servicing of the sensor unit.

The tube 226 has a stainless steel or other ferromagnetic metal ring below its bottom and secured to the tank top 218 for magnetic attraction to magnets in the sensor housing 232. A preferred metal is 400 series grade stainless metal plate, which provides reasonably good magnetic attraction properties balanced with reasonably good corrosion resistance properties. The housing 232 has a coiled data and power cable 234 extending to antenna 229 (see FIG. 11). The housing 232 may contain the sensor, the electronics unit, and the battery. Antenna 229 provides cell phone connection, WiFi, NFC, Bluetooth or the like is positioned at the top of the tube 226 connected by a wire that extends to the electronics unit in the housing 232. The antenna is built into a handle-shape, so the housing and the components it contains can be easily pulled up the tube 226 when service is needed. A separate tether can be used to add tensile strength. In some embodiments the electrical wire connecting the antenna to the items below can also serve as the tether.

Certain modifications and improvements will occur to those skilled in the art upon reading the foregoing description. It should be understood that such modifications and improvements have been omitted for the sake of conciseness and readability, but are properly within the scope of the following claims

What is claimed is:

1. An apparatus containing a F.O.G. (fats, oil, grease) layer on water comprising: a rounded tank having an inlet and an outlet located opposite of the inlet on the tank, the inlet connected to a source carrying a F.O.G. laden effluent and the outlet connecting to a sewer pipe, such that the tank is a flow through unit for the effluent from the source, the F.O.G separated in the tank, and the effluent out through the sewer pipe; the location of the outlet defining a normal static water level in the tank, the normal static water level being maintained by drainage through the outlet when the normal static water level falls at or above an entrance to the outlet, the top of the F.O.G. layer variably rising above the normal static water level because of a specific gravity of the F.O.G. layer being less than the specific gravity of water and a passive F.O.G separation within the tank, and a non-contact sensor mounted in the tank above the normal static water level and above a maximum top level of the F.O.G. layer and effluent to: be a non-emersed sensor in the tank, sense a distance from the non-contact sensor to the top of the F.O.G. layer within the tank, and determine the height of the F.O.G. layer with respect to the normal static water level, an extension collar extending from a ground access cover to a tank top, the non-contact sensor mounted along a low part of the extension collar and a battery and electronics unit mounted at a higher part along the extension collar, and a tube extending substantially the length of the extension collar, the non-contact sensor and the electronics unit separated and connected by way of a cable encased within the tube, wherein the non-contact sensor provides feedback for timing on removal of the F.O.G. layer from the tank.

2. The apparatus as claimed in claim 1 wherein the non-contact sensor is a LIDAR sensor.

3. The apparatus as claimed in claim 1 wherein the non-contact sensor is a LIDAR sensor operating at about 940 nm.

4. The apparatus as claimed in claim 1 wherein the non-contact sensor is held in place at the tank top by magnets.

5. The apparatus as claimed in claim 1 wherein the tank has the extension collar above a main body of the tank and the non-contact sensor is mounted in the extension collar.

6. The apparatus as claimed in claim 5 wherein the extension collar is generally cylindrical and formed of arc segments molded of rotomolded plastic.

7. The apparatus as claimed in claim 1 further comprising the electronics unit that includes a transmitter to transmit a signal indicative of F.O.G. level in the tank.

8. The apparatus as claimed in claim 5 wherein the cable is a coiled electrical cord, and a tether having tensile strength sufficient to pull the non-contact sensor upwardly through the extension collar for service extends up the extension collar.

9. The apparatus as claimed in claim 1 further comprising an extension top resting on the extension collar, the extension top, the extension collar and the tank top having aligned openings enabling a suction pipe to pass through the aligned openings for suctioning of the F.O.G. layer, and a cover fitting on the opening in the extension top to close the aligned openings when suctioning is not needed.

10. The apparatus as claimed in claim 1 wherein the non-contact sensor operates using computer vision.

11. The apparatus as claimed in claim 1 wherein the electronics unit has a data analysis module associated with the electronics unit configured to deal with deviations from normal static water levels.

12. The apparatus as claimed in claim 1 wherein the non-contact sensor is an ultrasonic sensor and includes a temperature sensor to permit temperature compensation of readings by the ultrasonic sensor.

13. The apparatus as claimed in claim 1 wherein the outlet includes a downwardly oriented invert, so that the water exiting the tank is taken in through the invert from the water at a low part of the tank, below the F.O.G., and the positioning of the outlet determines a static water level within the tank.

14. The apparatus as claimed in claim 1 including a tether extending in the tube, the tether being removable from the tube and attached to the non-contact sensor such that upon retracting the tether, the non-contact sensor is removable from the tube for servicing or replacement.

15. A method of sensing a F.O.G. (fats, oils, grease) level in a rounded tank having an inlet and an outlet located opposite of the inlet on the tank, the inlet configured to connect to a source of F.O.G. laden effluent and the outlet configured to connect to a sewer pipe, such that the tank is a flow through unit for the effluent from the source, the F.O.G separated in the tank, and the effluent out through the sewer pipe; the outlet defines a normal static water level in the tank comprising: separating a non-contact sensor and an electronics unit by an extension collar that extends from a ground access cover to a tank top, mounting the non-contact sensor along a low part of the extension collar, mounting a battery and electronics unit at a higher part along the extension collar, and connecting the non-contact sensor and the battery and electronics unit through a tube extending substantially the length of the extension collar, separating and connecting the non-contact sensor and the electronics unit by way of a cable encased within the tube, sensing a distance between a non-contact sensor that is fixed at a position above the normal static water level and a top of a F.O.G. layer above the normal static water level within the tank and using the sensed distance to determine if the amount of F.O.G in the tank exceeds a threshold warranting F.O.G. removal from the tank.

16. The method as claimed in claim 15 wherein F.O.G. removal includes actuating a skimmer.

17. The method as claimed in claim 15 wherein F.O.G. removal includes pumping F.O.G. from the tank.

18. The method as claimed in claim 15 wherein the sensing is LIDAR sensing.

19. The method as claimed in claim 15 wherein the sensing is LIDAR sensing at about 940 nm.

20. The method as claimed in claim 15 further comprising analyzing data about the distance between the non-contact sensor and the normal static water level to deal with deviations from normal static water levels.

21. The method as claimed in claim 15 wherein the sensing is computer vision sensing.

22. The method as claimed in claim 15 wherein the sensing is ultrasonic sensing and temperature sensing with temperature compensation of data from ultrasonic sensing.

23. The method as claimed in claim 15 including draining effluent from the tank through an invert to the outlet so the effluent exiting the tank comes from a low part of the tank, allowing the outlet to maintain a static water level within the tank passively.

* * * * *

UNITED STATES PATENT AND TRADEMARK OFFICE
CERTIFICATE OF CORRECTION

| | |
|---|---|
| PATENT NO. | : 11,708,691 B2 |
| APPLICATION NO. | : 16/753498 |
| DATED | : July 25, 2023 |
| INVENTOR(S) | : William C. Batten et al. |

It is certified that error appears in the above-identified patent and that said Letters Patent is hereby corrected as shown below:

In the Claims

In Column 9, Line 39, Claim 9 --openings for suctioning of the F.O.G. laver, and a cover-- should read "openings for suctioning of the F.O.G. layer, and a cover"

Signed and Sealed this
Twelfth Day of September, 2023

Katherine Kelly Vidal
*Director of the United States Patent and Trademark Office*